R. LITTLE.
Coffee Roaster.
No. 29,798.
Patented Aug. 28, 1860.
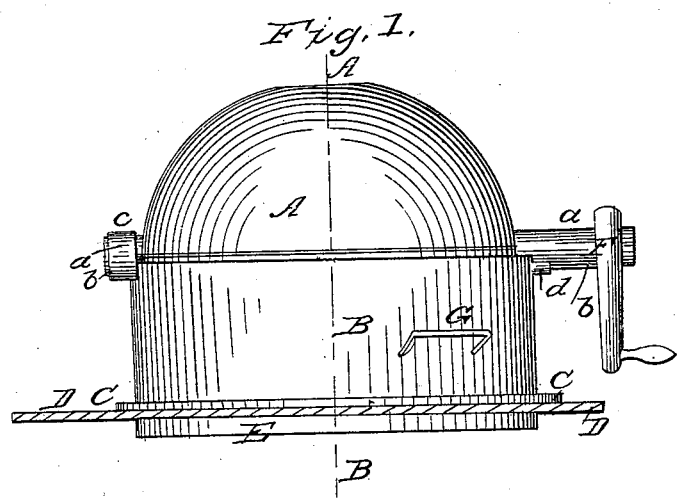
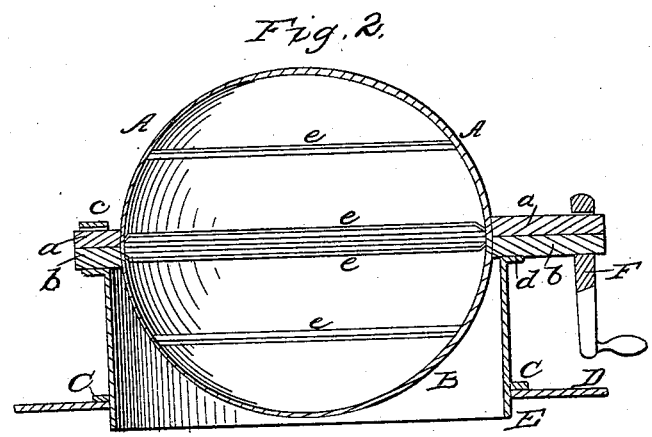
Witnesses:
Inventor:
R. Little
Thos. H. Dodge,

UNITED STATES PATENT OFFICE.

R. LITTLE, OF MIDDLEBRANCH, OHIO.

COFFEE-ROASTER.

Specification of Letters Patent No. 29,798, dated August 28, 1860.

*To all whom it may concern:*

Be it known that I, R. LITTLE, of Middlebranch, in the county of Stark and State of Ohio, have invented a certain new and useful Improvement in Coffee-Roasters; and I do hereby declare that the following is a clear, full, and exact description thereof, reference being had to the accompanying drawings, forming a part of this specification, in which—

Figure 1 represents a side view of my improved coffee roaster with a section or part of the stove plate D, and Fig. 2 represents a section through the center of the roaster, taken at right angles to line A B, Fig. 1.

In the drawings A, represents the shell of the roaster which is of an oval form divided at the center as shown in the drawings.

To one half of the shell are attached projections $a$, $a$, while to the other half are attached projections $b$, $b$, so that when the two parts of the shell are placed together the projections $a$, $a$, and $b$, $b$, form the journals or bearings upon which the shell A, rotates.

The projections $a$, $b$, of one end are passed through a ring or closed box $c$, fastened to the top of the case B, while the projections $a$, $b$, of the other end rest in an open box or bearing $d$, and are held together by the crank F, which is slipped over both $a$, and $b$, as fully shown in the drawings.

The case B, is provided near its bottom with a flange C, for the purpose of resting on a stove plate as shown at D, while only a portion E, of the case will project down into the stove.

The interior of shell A, is provided with a series of endless ribs $e$, $e$,—the ribs in one half of the shell inclining in an opposite direction from those in the other.

The operation is as follows: The coffee to be roasted is placed in the shell A, and then the shell A, and case B, are placed over an opening in the top of a stove as indicated in the drawings, when the operator takes hold of the crank F, and rotates the shell A, whereby the coffee is so agitated and stirred as to cause it to be roasted in an even and expeditious manner. The oval form of the shell combined with the reverse inclined ribs $e$, $e$, on the interior of the same, cause the coffee to spread out so as to keep more of it in contact with the heated surface than would otherwise be the case, while none of the coffee is allowed to remain too long at the bottom, since the coffee is carried up twice at every revolution of the roaster, while it is also allowed to roll back over the ribs the same number of times at each revolution, thus causing it to become well and thoroughly stirred.

The case B, is provided with handles G, one of which is shown in Fig. 1, whereby the roaster can be lifted off of the stove whenever desired.

Having described my invention, what I claim and desire to secure by Letters Patent, is—

The combination with the oval and divided shell A, of the series of endless, reversed inclined ribs $e$, $e$, arranged and operating as shown and described.

In witness whereof I have hereunto subscribed my name.

R. LITTLE.

Witnesses:
 D. B. RALSTON,
 Z. M. DAVIS.